UNITED STATES PATENT OFFICE.

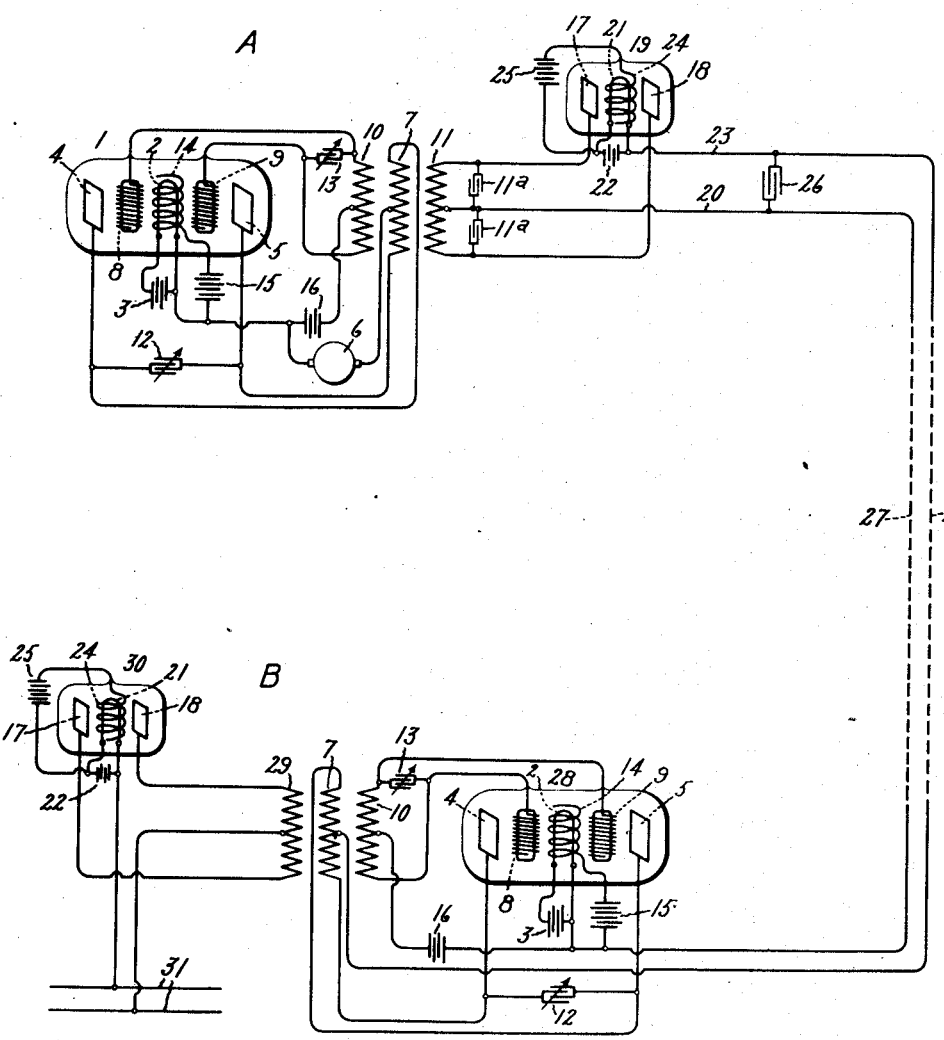

IRVING LANGMUIR, OF SCHENECTADY, NEW YORK, ASSIGNOR TO GENERAL ELECTRIC COMPANY, A CORPORATION OF NEW YORK.

SYSTEM OF DISTRIBUTION.

1,280,769.  Specification of Letters Patent.  Patented Oct. 8, 1918.

Application filed March 31, 1914. Serial No. 828,479.

*To all whom it may concern:*

Be it known that I, IRVING LANGMUIR, a citizen of the United States, residing at Schenectady, county of Schenectady, State of New York, have invented certain new and useful Improvements in Systems of Distribution, of which the following is a specification.

The present invention relates to a system for transmitting electrical energy, and more especially to a system in which energy is transmitted in the form of direct current. In view of the many difficulties attendant upon the transmission of electrical energy to great distances by means of high tension alternating currents it has long been recognized that in many cases a system of transmission by means of high tension direct currents would be much preferable. Such systems, however, have not heretofore been widely adopted because of the difficulties attendant upon the changing of direct currents from one voltage to another. While systems employing high voltage direct current transmission have been installed in a few instances such systems are lacking in the great flexibility of operation characteristic of alternating current transmission. In order to utilize the transmitted energy at any desired point they also require expensive installations of machinery having moving parts, some of which have to be insulated to withstand the high voltages.

I have discovered, however, that by a suitable arrangement of new forms of electron discharge apparatus devised by myself the difficulties heretofore attendant upon the production of high tension direct currents may be overcome and that direct currents having a voltage at least as great as those now used in alternating current transmission may be obtained and economically transmitted to great distances. Furthermore the system which I am about to describe contains no moving parts and hence the insulation problems connected therewith are no more difficult than those met with in alternating current systems. It also has the same flexibility of operation as an alternating current system in that any amount of power desired may be utilized at any point desired by the installation of comparatively simple apparatus for changing the current from high voltage to the voltage desired for utilization. By the term "electron discharge device" I mean to imply an exhausted envelop containing at least two electrodes, one of which is provided with means for causing it to emit electrons, the degree of vacuum in the envelop being such that with any voltage which may be applied to the electrodes the flow of current from the electron emitting electrode to the other electrode or electrodes will take place without any visible manifestations of gas ionization such, for example, as blue glow.

The novel features which characterize my invention are pointed out with particularity in the appended claims. The invention itself, however, will be best understood by reference to the following description taken in connection with the accompanying drawing in which I have illustrated a single way in which my invention may be carried into effect.

As here shown and described I use an electron discharge device which I term an oscillator, for the production of high frequency, alternating current of a voltage such as may be easily obtained by an ordinary direct or alternating current generator. The high frequency alternating current thus obtained is transformed to the voltage which it is desired to employ for transmission purposes. The high tension, high frequency, alternating current thus obtained is rectified by means of an electron discharge rectifier and transmitted to the point at which it is desired to be utilized. At the receiving end of the system the high tension direct current is converted into high frequency, high tension alternating current by means of a second oscillator. The high frequency, high tension alternating current thus obtained is transformed to the voltage desired and is there rectified and led to the bus bars of the receiving station for utilization in any way desired.

As shown in the drawing the oscillator at the transmitting end A of the system comprises an exhausted envelop 1 which is usually of glass, a cathode 2 of filamentary form with means for heating the same consisting of a local battery 3 and two plate shaped anodes 4 and 5. An oscillatory circuit is provided between the cathode and each anode. Each oscillatory circuit comprises a source of energy 6 which may be a battery or a direct or alternating current generator and one-half of the coil 7. These circuits for convenience in description I designate as plate circuits. In addition to the cathode and anodes the tube comprises conducting bodies 8 and 9 in the form of grids interposed between the cathode and anodes. These grids are also connected to the cathode by means of external oscillatory circuits each of which comprises one-half of the coil 10. These circuits I designate the grid circuits. The coils 7 and 10 are preferably placed in inductive relation to each other. If the coils are wound in the same direction, when the current in one plate circuit begins to build up, current tends to flow in the opposite direction in the corresponding grid circuit, and the grid becomes negatively electrified. This cuts down the flow of current in the plate circuit and as the current decreases the grid loses its negative potential and becomes positive. This allows the current to increase again in the plate circuit and these changes may take place with great rapidity, their frequency depending upon the natural periods of the circuits. The frequency of the current changes may be readily varied by varying the constants of the grid circuit and by so doing current of any frequency desired may be obtained in the coil 11 which should be closely coupled to the coil 7. The two coils preferably constitute the primary and secondary of an oscillation transformer so proportioned that the current obtained in coil 11 will have the voltage desired for transmission. Condensers 11ª may be connected between the ends and the middle point of coil 11 as shown. The frequency of the current may easily be adjusted by means of the adjustable condensers 12 and 13 connected to the plate and grid circuits respectively, as shown. It will be apparent that with this arrangement when one of the grids is negative the other is positive and vice versa, and consequently when the current is decreasing in one plate circuit it is increasing in the other. As a result the current induced in the coil 11 is much greater than it would be if only a single plate circuit was in operation. To improve the efficiency of the device a conducting body may be provided in proximity to the cathode. This may take the form of a grid 14 surrounding the cathode but insulated therefrom. Upon this conducting body I impress a positive potential from the battery 15. In some cases also it may be desirable to impress an extra potential on the grids in order that they may normally have a certain definite potential with respect to the cathode. This may be done by means of an extra battery 16, as indicated. The form of electron discharge device here shown and the operation thereof are described and the novel features claimed in my co-pending applications Serial Nos. 795,609 and 795,610, filed October 16, 1913, and Serial No. 797,987, filed October 27, 1913.

The ends of coil 11 are connected to the plate shaped anodes 17 and 18 inclosed in the highly exhausted envelop 19 of an electron discharge rectifier and the middle portion of this coil is connected with the conductor 20 which leads to the transmission line. The envelop 19 also incloses the cathode 21 which is provided with the usual battery 22 or other source of current for heating the same and is connected by the conductor 23 to the other side of the transmission line. The cathode in this case is preferably surrounded by a grid 24 which is positively charged by means of the battery 25. A condenser 26 may be connected between the conductors 20 and 23 as shown, in order to smooth out the current pulses. In order to secure the high degree of vacuum of the exhausted envelop necessary for operation with voltages such as are employed for power transmission I have found that the exhaustion of the envelops in the devices which I have described must be carried out by the use of highly efficient means such, for example, as a Gaede molecular pump and that especial care must be taken to remove all gas from the walls of the envelop and from the electrodes both by heating and by subjecting the anodes to electron discharge while the envelop is still connected to the pump. The rectifier here shown and its method of operation are described and certain novel features thereof claimed in my co-pending application, Serial No. 797,986, filed October 27, 1913.

From the rectifying apparatus the high tension direct current is conducted over the transmission line, which is here indicated by dotted lines 27, to the receiving end B of the system located near a point where it is desired to utilize the energy transmitted. The direct current transmitted is brought to the plate circuits of the second oscillator 28 which may be of similar construction to the first one described. By this means it is converted to a high tension, high frequency alternating current and the voltage of this current is reduced by an oscillation transformer so that it appears in the coil 29 as a high frequency, low voltage alternating current. This high frequency alternating current is rectified by means of the electron discharge rectifier 30 which may be similar to the rectifier used at the transmitting end of the system. Inasmuch as the voltage of rectification may be comparatively low other forms of rectifiers may be employed at the receiving end if desired. From this rectifier current may be led to the bus-bars 31 of the receiving station from which it may be distributed locally as desired. It will of course be understood that as many generating or distributing points as desired may be connected to a single system of distribution.

While I have illustrated only a single organization whereby the desired result may be accomplished, many modifications thereof may be made without departing from the scope of my invention.

What I claim as new and desire to secure by Letters Patent of the United States, is:—

1. The combination of a source of direct current, an electron discharge device for converting the direct current into alternating current, means for transforming the alternating current into another alternating current of different voltage, and means for reconverting the last named alternating current into direct current.

2. The combination of a source of direct current, an electron discharge device for converting the direct current into high frequency alternating current, means for transforming the alternating current into another alternating current of different voltage, and means for reconverting the last named alternating current into direct current.

3. The combination of a source of current, an electron discharge device for converting the current from said source into high frequency alternating current, means for transforming the alternating current into another alternating current of different voltage, and means for reconverting the last named alternating current into direct current.

4. The combination of a source of direct current, an electron discharge device for converting the direct current into a high frequency alternating current, means for transforming the alternating current into another alternating current of different voltage and an electron discharge rectifier for reconverting the last named alternating current into direct current.

5. In combination in a system for transmitting electrical energy, a source of electrical energy, means for converting the energy from said source into a high frequency alternating current, means for rectifying said high frequency alternating current, an electron discharge device for reconverting said rectified current to a high frequency alternating current, and means for rectifying the last named alternating current.

6. The combination in a system for transmitting electrical energy of a source of electrical energy at the transmitting end of the system, an electron discharge device for converting said energy into high frequency alternating current, means for rectifying said alternating current, means at the receiving end of the system for reconverting said rectified current into high frequency alternating current, and means for rectifying said high frequency alternating current.

7. In combination in a system for transmitting electrical energy, electron discharge apparatus at the transmitting end of the system for producing high voltage direct current and means at the receiving end of the system for changing the voltage of the transmitted current.

8. The combination in a system for transmitting electrical energy of electron discharge apparatus at the transmitting end of the system for producing high voltage direct current and means comprising electron discharge apparatus at the receiving end of the system for changing the voltage of the transmitted current.

9. The combination in a system for transmitting electrical energy of electron discharge apparatus at the transmitting end of the system for producing high voltage direct current from a low voltage source of current and electron discharge apparatus at the receiving end of the system for changing the voltage of the transmitted current.

10. The combination of a source of direct current, means comprising an electron discharge device for producing a high frequency high voltage alternating current therefrom, and means for reconverting the alternating current into direct current.

11. The combination of a source of current, means comprising an electron discharge device for producing a high frequency high voltage alternating current therefrom, and means comprising an electron discharge device for reconverting the alternating current into a direct current.

12. The combination of a low voltage source of current, means comprising an electron discharge device for producing a high frequency, high voltage alternating current therefrom, and means for rectifying said alternating current.

13. The combination in a system of distribution of a source of electrical energy, an electron discharge device for converting the energy from said source into a high frequency alternating current, an electron discharge device for rectifying said high frequency alternating current, means for reconverting said rectified current to a high frequency alternating current, and means for rectifying the last named alternating current.

14. The combination in a system of distribution, of a source of low voltage direct current, an electron discharge device for converting the current from said source into high frequency alternating current, means for transforming the alternating current into another alternating current of higher voltage, means comprising an electron discharge device for rectifying the last named alternating current, means comprising an electron discharge device for reconverting said rectified current to a low voltage high frequency alternating current, and means for rectifying the last named alternating current.

In witness whereof, I have hereunto set my hand this 30th day of March, 1914.

IRVING LANGMUIR.

Witnesses:
 BENJAMIN B. HULL,
 WILLIAM C. WHITE.